(12) United States Patent
Rumi (10) Patent No.: US 12,422,547 B2
(45) Date of Patent: Sep. 23, 2025

(54) ATMOSPHERIC PRESSURE SENSOR

(71) Applicant: United Kingdom Research and Innovation, Swindon (GB)

(72) Inventor: Emal Rumi, Oxfordshire (GB)

(73) Assignee: United Kingdom Research and Innovation, Swindon (GB)

( * ) Notice: Subject to any disclaimer, the term of this patent is extended or adjusted under 35 U.S.C. 154(b) by 164 days.

(21) Appl. No.: 18/035,873

(22) PCT Filed: Nov. 9, 2021

(86) PCT No.: PCT/EP2021/081142
§ 371 (c)(1),
(2) Date: May 8, 2023

(87) PCT Pub. No.: WO2022/101218
PCT Pub. Date: May 19, 2022

(65) Prior Publication Data
US 2023/0408687 A1    Dec. 21, 2023

(30) Foreign Application Priority Data
Nov. 10, 2020    (GB) .................................. 2017739

(51) Int. Cl.
*G01S 13/95* (2006.01)
*G01S 7/40* (2006.01)

(52) U.S. Cl.
CPC .......... *G01S 13/955* (2013.01); *G01S 7/4013* (2021.05); *G01S 7/4021* (2013.01)

(58) Field of Classification Search
CPC ..... G01S 13/955; G01S 7/4013; G01S 7/4021
See application file for complete search history.

(56) References Cited

U.S. PATENT DOCUMENTS

| | | | | |
|---|---|---|---|---|
| 5,012,251 A * | 4/1991 | Kennedy | ............... | G01S 7/4021 342/182 |
| 5,526,676 A * | 6/1996 | Solheim | .................. | G01W 1/08 73/170.27 |
| 8,855,932 B1 * | 10/2014 | Lin | ......................... | G01L 11/02 702/109 |
| 11,747,514 B1 * | 9/2023 | McLinden | ........... | G01K 11/006 137/382 |

OTHER PUBLICATIONS

Dennis A. Flower et al., "A Microwave Pressure Sounder", NASA, Jet Propulsion Labaratory, Aug. 1, 1978, 139 pages, Pasadena, CA.
(Continued)

*Primary Examiner* — David R Dunn
*Assistant Examiner* — Nazra Nur Waheed
(74) *Attorney, Agent, or Firm* — Lempia Summerfield Katz LLC (57) ABSTRACT

There are disclosed methods and apparatus for remotely measuring atmospheric pressure using a satellite (10). Measurements of reflections of a plurality of different frequencies of radio waves received back at the satellite are made, following transmission from the satellite into the atmosphere of radio waves at each of the different frequencies. Atmospheric pressure is then estimated by comparing the measurements of reflections of each of the different frequencies.

21 Claims, 8 Drawing Sheets

(56) References Cited

OTHER PUBLICATIONS

International Search Report and Written Opinion of the International Searching Authority from International Patent Application No. PCT/EP2021/081142, 11 pages, Feb. 14, 2022.
Roland Lawrence et al., "Initial flight test results of differential absorption barometric radar for remote sensing of sea surface air pressure", Journal of Quantitative Spectroscopy & Radiative Transfer 112, 2011, pp. 247-253.
Barrick, D. E. "A Review of Scattering From Surfaces with Different Roughness Scales", Radio Sci. 3:865-68 (1968).
Bing Lin, Qilong Min, "Optimal frequency selection of multi-channel O2-band different absorption barometric radar for air pressure measurements", Journal of Quantitative Spectroscopy and Radiative Transfer, vol. 188, pp. 188-191 (2017).
Bing Lin, Yongxiang Hu "Numerical simulations of radar surface air pressure measurements at O2 bands" IEEE Geosci. Remote. Sens. Lett. 2(3): 324-328 (2005).
Figa-Saldaña, J. et al. "The Advanced Scatterometer (ASCAT) on the Meteorological Operational (MetOp) Platform: A Follow on for European Wind Scatterometers", Canadian Journal of Remote Sensing, 28:3, 404-412, DOI: 10.5589/m02-035 (2002).
Flower, D. A. and Peckham, G. E. and Bradford, W. J. "Experimental Validation of a Millimeterwave Radar Technique to Remotely Sense Atmospheric Pressure at the Earth's Surface", Proceedings of IGARSS 84 Symposium, Strasbourg (1984).
GB Search Report from Application GB2017739.0, dated Jul. 16, 2021, 4 pages.
Ingleby, B. "Global Assimilation of Air Temperature, Humidity, Wind and Pressure from Surface Stations: Practice and Performance", Forecasting Research Technical Report, No. 582. The Met Office (2013).
International Search Report from International Patent Application No. PCT/EP2021/081142, dated Feb. 14, 2022, 3 pages.
ITU Recommendation, "Attenuation by Atmospheric Gases", p. 676-11 (2016).
Peckham, G. E. and Flower, D. A. "A Microwave Pressure Sounder for Remote Measurement of Atmospheric Pressure", International Geoscience and Remote Sensing Symposium, Washington, DC, vol. 1. (A83-1000101-42) New York, Institute of Electrical and Electronics Engineers, pp. 46-51 (1981).
Rumi, E. et al. "Active Microwave Air-Pressure Sensor", ESA Contract No. 4000120263/17/NL/FE, Final Report (2018).
Rumi, E. et al. "Instrument Concept Design Surface Air-Pressure Radar Mission", LivingPlanet Conference, Poster, ESA (2019).

* cited by examiner

ATMOSPHERIC PRESSURE SENSOR

RELATED APPLICATIONS

The present patent document is a § 371 nationalization of PCT Application Serial No. PCT/EP2021/081142, filed Nov. 9, 2021, designating the United States, which is hereby incorporated by reference, and this patent document also claims the benefit of United Kingdom Application Nos. GB 2017739.0, filed Nov. 10, 2020, which is also hereby incorporated by reference.

The present disclosure relates to methods and apparatus for remote sensing of air pressure, for example using satellite based radar.

Introduction

Atmospheric pressure, for example surface air-pressure, is one of the most important parameters used in Numerical Weather Prediction (NWP) models. These models are critical for weather forecasting, and improvements in global surface air-pressure measurements have the potential to dramatically reduce uncertainties in the outputs of such models. There are rather limited numbers of physical weather stations able to measure surface air pressure, and the network of such stations is very heterogeneously distributed, and has been shrinking over recent last decades due to high costs of installation and maintenance. Moreover, although ships and aircraft are able to make atmospheric pressure measurements across the oceans and less accessible parts of the land, these are able to cover only very limited areas and only intermittently.

It would be desirable to address problems and limitations of the related prior art.

SUMMARY OF THE INVENTION

The invention proposes to provide measurements of atmospheric pressure over wide areas using an orbiting satellite platform, which in principle can provide frequently repeated and largely global coverage, depending on the orbit chosen. Embodiments of the invention measure atmospheric or surface pressure using a satellite based multi spectral pulsed millimeter-wave radar operating around the oxygen band. Using the described arrangements, pressure measurements with uncertainty less than ±1 hPa and at spatial resolution around 5 km×5 km are achievable.

In particular, a technique based on differential absorption in the 60 GHz absorption band of oxygen is proposed. The technique uses one or more pairs of pressure sensing frequency channels, such a pair including one in-band frequency channel closer to the absorption peak, and another further away from the peak. Particular frequency bands for these channels are proposed below. The ratio of attenuation of the two channels of such a pair, or the differential absorption, is a measure of the total oxygen in the radar path. Since the oxygen is well-mixed in the atmosphere, this is simply related to the total surface pressure.

Measurements using such a pair of channels may be susceptible to inaccuracies due to differences between the channels in sensitivity to the atmospheric water vapour content and cloud cover. A microwave radiometer also provided on the satellite may therefore provide measurements of water vapour and liquid water or cloud cover, for use in compensating estimates of the atmospheric pressure.

In particular, aspects of the invention provide a method comprising: receiving measurements of reflections received back at a satellite at each of a plurality of different frequencies of radio waves, following transmission from the satellite into the atmosphere of radio waves at each of those frequencies; and estimating atmospheric pressure using the measurements, for example by comparing the measurements at each of the different frequencies.

For example, the measurements of reflections received back at the satellite may be or may comprise measurements of received power at the satellite at each of said different frequencies. Estimating atmospheric pressure using the measurements may comprise determining one or more ratios of measurements of the received reflections, for example measurements of received power, at one or more pairs of said frequencies, and estimating atmospheric pressure from said determined ratios.

Some aspects of the invention relate particularly to the receiving of measurements and processing those measurements to estimate or measure atmospheric pressure, and so do not include operation of or activities at or by the satellite. However, some other aspects of the invention do also include control or operation of or at the satellite, and/or activities taking place at the satellite such as transmitting, by the satellite, or more particularly by a radar system carried by the satellite, the radio waves of the plurality of different frequencies into the atmosphere, and receiving back and measuring, at the satellite, reflections of the transmitted radio waves.

The plurality different frequencies of radio waves may comprise at least three different frequencies of radio waves. Two or more distinct ratios of received reflection measurements, each using a different combination of the frequencies, may then be used to either make separate estimations of atmospheric pressure which can be averaged or combined together as required, or to provide an estimate of atmospheric pressure with reduced errors.

All of the plurality of different frequencies may be within the upper wing of the 60 GHz oxygen absorption band, for example in the range from 60 to 80 GHz or 60 to 90 GHz.

The plurality of frequencies may be selected to lie in two distinct frequency bands. To this end, one or more of the plurality of different frequencies may lie in a first frequency band, and the one or more remaining different frequencies may then lie in a second frequency band which is spaced from said first frequency band. Estimating atmospheric pressure may then comprise comparing between the measurements at a pair or pairs of frequencies, where each pair comprises a frequency in both of the frequency bands.

If the first frequency band comprises one, and the second frequency band comprises two, of the plurality of different frequencies, then estimating atmospheric pressure may comprise comparing measurements of reflections at the frequency in the first frequency band with measurements of the reflections at each of the frequencies in the second frequency band.

The first frequency band may be defined by or be limited to the range of frequencies from 65.0 to 66.0 GHz, which is sufficiently close to the 60 GHz peak to provide adequate but not excessive absorption of the transmitted power, and optionally excluding the end values of tis range.

However, to avoid cusp features in the absorption spectrum, this first band may be further limited to the range of frequencies from 65.3 to 66.0 GHz, or may be further limited to the range of frequencies from 65.775 or 65.78 or 65.8 GHz, to 66.0 GHz. The first band may also or instead exclude one or more of the ranges of frequencies from 65.20 to 65.25 GHz or from 65.2 to 65.3 GHz, from 65.72 to 65.78 GHz, from 65.7 to 65.775 GHz, or from to 65.8 GHz.

The second frequency band may be limited to the range of frequencies from 78.0 to 79.0 GHz (optionally excluding the end values of this range), for example with the transmitted frequencies comprising two separate frequencies within this band that are separated by at least 0.5 GHz. This frequency band then provides suitable spacing from the first frequency band to the second frequency band for a strong differential between the absorption levels, without excessive differences in absorption due to water vapour, and permitting for example the effective use of the same antenna and similar advantages.

The method may further comprise receiving radiometer measurements of radio waves received at the satellite indicative of one or more of water vapour, liquid water, and temperature, in particular generally beneath the satellite or along the radar path, that is, along the path of the radio waves transmitted from the satellite into the atmosphere and reflected back to the satellite.

An advantage of using such a microwave radiometer which is also located on the transmitting and reflection receiving satellite is that the footprint on the ground of the transmitted radio waves, and of the microwave radiometer field of view, can be accurately collocated both in time and space. However, in some embodiments, such radiometer measurements may be of radio waves received instead at a second satellite that is sufficiently closely spaced with the transmitting and reflection receiving satellite for the measurements to still be sufficiently indicative of one or more of water vapour, liquid water and/or temperature along the path of the transmitted and reflected received radio waves, and therefore still useful for purposes such as correcting the estimated pressure for vapour and liquid water in the radar path. For example, a second satellite in a tandem orbit with the first may be used.

Suitable frequency bands for the radiometer measurements which are indicative of water vapour and liquid water include the water vapour band around the 22 GHz window, or around the 183 GHz window, for example being limited to the range of 175 to 192 GHz. Suitable frequency bands for the radiometer measurements indicative of temperature include the 50-58 GHz band.

Estimating atmospheric pressure may then be achieved by also using the radiometer measurements to compensate for water vapour and/or liquid water along the path of the radio waves transmitted from the satellite into the atmosphere and reflected back to the satellite. To this end, the radiometer measurements indicative of atmospheric temperature may be used to derive improved water vapour and/or liquid water estimates for use in this process. The radiometer measurements indicative of temperature may also or instead be used to provide an independent indicator of temperature in the atmosphere below the radiometer, and/or to derive from the estimate of atmospheric pressure an approximate profile of pressure with altitude.

The satellite, or more particularly a radar system carried by the satellite, may transmit, and be arranged to transmit, the plurality of different frequencies of radio waves simultaneously. In this way, the reflection properties of the Earth's surface, which may fluctuate rapidly along the ground track of reflection area, will be approximately the same for all of the frequencies.

The satellite, or more particularly a radar system carried by the satellite may one or both of, and may be arranged to one or both of: transmit all of the plurality of frequencies using the same one or more antennae of the satellite or radar system; and receive back all of the plurality of frequencies for measurement using the same one or more antennae of the satellite or radar system. The one or more antennae used for transmitting may be the same as the one or more antennae used for receiving. The satellite or radar system may transmit, and be arranged to transmit, the plurality of different frequencies of radio waves using the same transmitted or transmitter power. The satellite or radar system may transmit, or be arranged to transmit, the radio waves in the nadir direction relative to the satellite, for example within one or two degrees of the nadir direction. Transmitting from the nadir leads to higher reflection from the Earth's surface, especially the sea surface. The transmissions at each frequency may be pulsed, rather than being continuous wave.

The invention also provides computer program code arranged to implement the above methods, and in particular to receive the various measurements from the satellite, and to estimate or measure or calculate atmospheric pressure using those measurements. The invention also provides one or more computer readable media comprising such computer program code.

The invention also provides apparatus arranged to carry out the above methods, for example apparatus arranged to receive measurements, of reflections received back at the satellite at each of a plurality of different frequencies of radio waves, following transmission from the satellite into the atmosphere of radio waves at each of the different frequencies, and to estimate atmospheric pressure by comparing between the measurements of reflections of each of the different frequencies.

Data processing aspects of the invention, such as aspects of estimating or calculating atmospheric pressure from the received measurements, may be implemented using one or more suitable computer systems. Such computer systems may comprise one or more processors for carrying out such data processing under the control of suitable computer software or program elements, in combination with suitable memory for storing such program elements and data required for the data processing steps, suitable data interfaces such as network connections, input devices such as keyboard and mouse, and output devices such as a visual display unit. Such computer systems may be located at the satellite, in ground based systems, or combinations of the two, for example with some processing of the radar data being carried out at the satellite before transmission to a ground station and being further processed.

Measurements made by the satellite may be stored before and/or after transmission to such computer systems.

BRIEF SUMMARY OF THE DRAWINGS

Embodiments of the invention will now be described, by way of example only, with reference to the accompanying drawings of which.

DETAILED DESCRIPTION OF EMBODIMENTS

Figure 1:
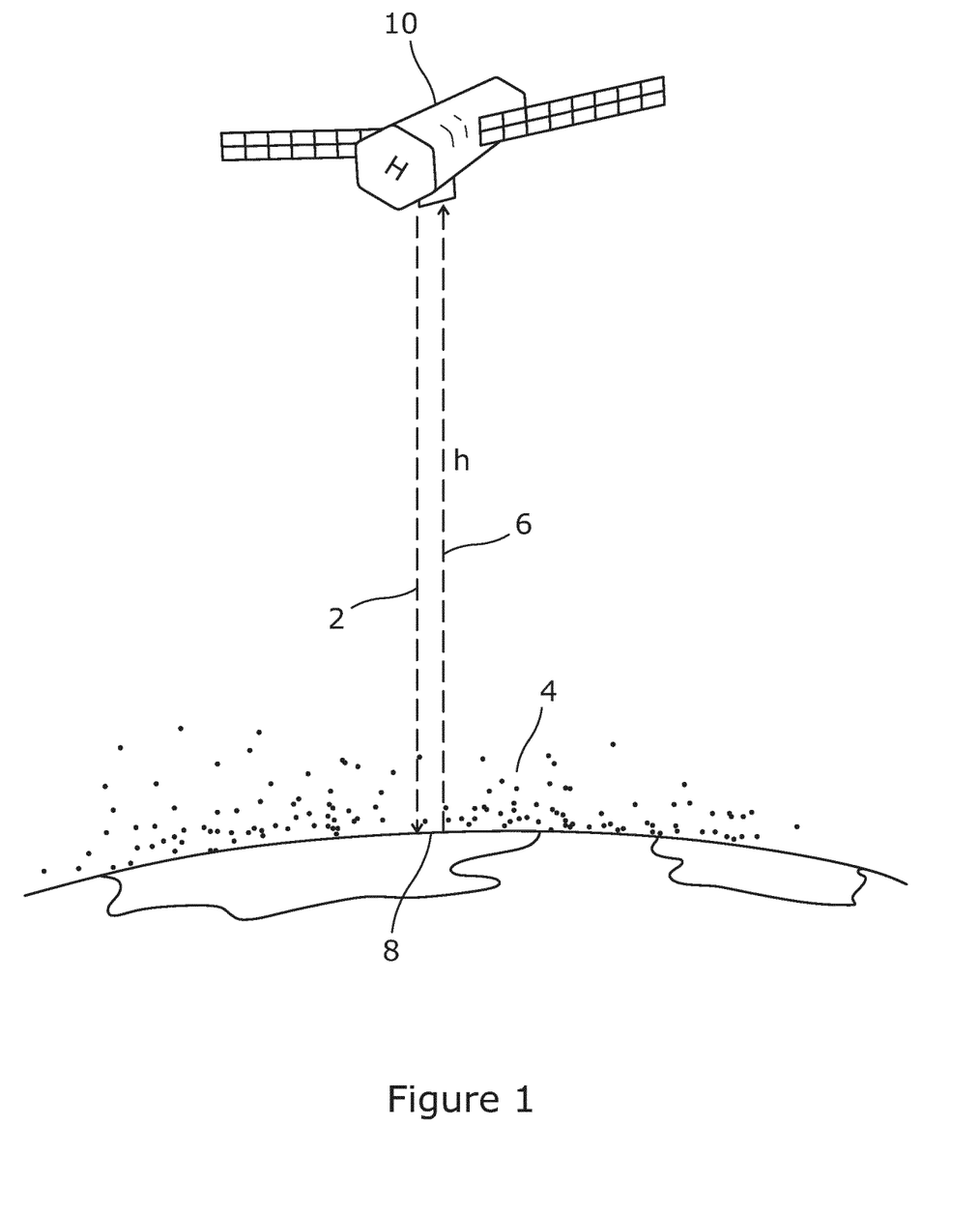
FIG. 1 illustrates a technique of measuring atmospheric pressure using radio waves transmitted from an orbiting satellite.

Referring to FIG. 1 there is illustrated a technique for remotely sensing atmospheric pressure using an orbiting satellite 10. According to this technique, the satellite transmits radio waves 2 of a plurality of different radio frequencies downwards into the Earth's atmosphere 4. Reflections 6 of those radio waves, which largely arise from reflection at the Earth's surface 8 (whether land or water) are received back at the satellite, where measurements of the received reflections at each of the different radio frequencies are taken. These may typically be measurements of power received back at the satellite at each radio frequency. The satellite altitude is denoted in FIG. 1 as h.

As discussed in more detail below, all of the plurality of radio frequencies are preferably located proximal to the radio absorption peak due to atmospheric oxygen which is centred at about 60 GHz (see FIG. 5). Although the amount of oxygen present in the path followed by the transmitted radio waves between transmission and reception back at the satellite is substantially the same for all frequencies, the different amount of absorption for different radio frequencies due to the shape of the oxygen absorption peak give rise to different measurements of reflection. The amount of oxygen in the path of the radio waves can therefore be deduced by comparing the received reflections at the different frequencies, typically using ratios of received power at one or more pairs of the different frequencies, for example where each pair comprises a frequency from each of two separated frequency bands within which all of the frequencies lie.

Since the oxygen is well mixed in the atmosphere, the amount of oxygen along the path of the radio waves can be readily equated to an estimate of atmospheric pressure, for example surface air pressure, for example as described in U.S. Pat. No. 8,855,932 and in D. Flower D. and G. Peckam, "*A microwave pressure sounder*", NASA Jet Propulsion Laboratory publication 78-68, 1 Aug. 1978.

Although this technique can be used with radio frequencies below the 60 GHz oxygen absorption peak, crowding of the radio spectrum in this region makes the task challenging. Instead, in described embodiments of the present invention, the inventors have found that the technique can also be implemented effectively by using a plurality of radio frequencies which are all located in the upper wing of the peak, for example between and 90 GHz, and more typically between about 65 and 80 GHz. More particular ranges of frequencies that can advantageously be used are described in more detail below.

Although the technique illustrated in FIG. 1 can be implemented using just two radio frequencies at which radio waves are subject to different amounts of atmospheric absorption by oxygen, by comparing the reflection measurements of those two frequencies, the inventors have also found that by using three or more such radio frequencies, an improved estimate of atmospheric pressure can be obtained.

For example, atmospheric pressure estimates made using two different pairs of radio frequencies can be averaged or combined in various ways to reduce the effects of equipment noise, unwanted variations due to fluctuations in atmospheric transmission and surface reflection, and other effects.

In particular, the inventors have found that a single radio frequency in a first band closer to the centre of the 60 GHz absorption band may be paired with each of two or more radio frequencies in a second band further from the centre of the 60 GHz absorption band, with each such pairing providing an independent estimate of atmospheric pressure, which can then be combined to improve the overall estimate. In order to balance complexity and cost of implementation with improvements in the estimates of atmospheric pressure, the inventors have found that three radio such frequencies may be used, one in a first band closer to 60 GHz, for example around 65 to 66 GHz, where absorption levels are higher but the complexity of the absorption band is also higher, and two in a second band further from GHz, where absorption levels are lower and the absorption band more linear, for example around 78 to 79 GHz.

Figure 2:
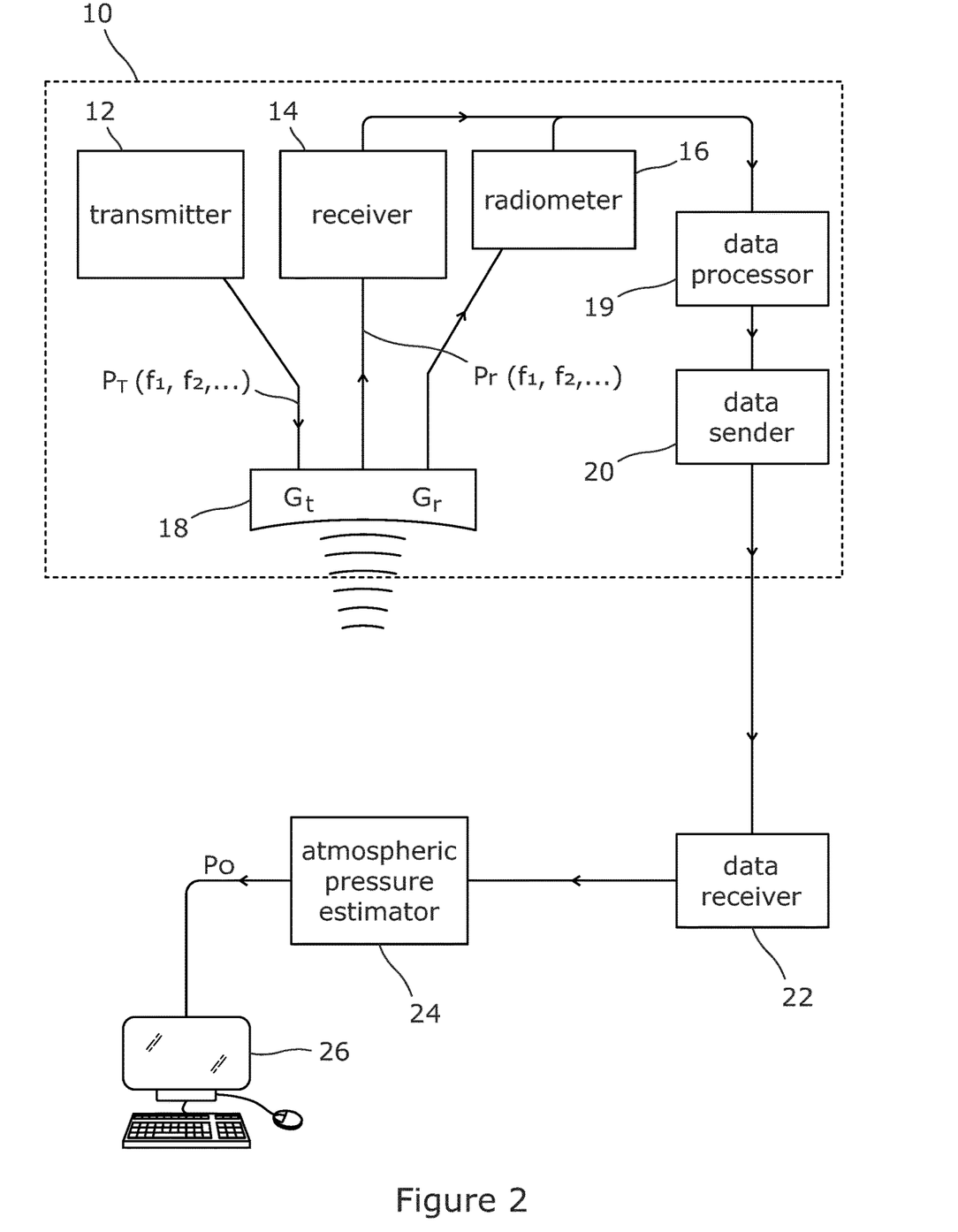
FIG. 2 schematically shows elements a system including the satellite of FIG. 1, for measuring atmospheric pressure.

FIG. 2 illustrates schematically some ways in which the technique of FIG. 1 may be implemented. Satellite 10 includes a transmitter 12, a receiver 14, an optional radiometer 16, an antenna 18, an optional data processor 19, and a data sender 20. The transmitter 12 generates signals at the required two, three, or more radio frequencies and feeds these to the antenna 18 for transmission towards the surface of the Earth. The transmitter power for each frequency $f_1$, $f_2$ etc. is preferably substantially the same, and is denoted in FIG. 2 as $P_T(f_1, f_2, \ldots)$. Preferably, transmission of this power by the antenna 18 may be directly downwards, towards the nadir relative to the satellite in order to maximise reflection back towards the satellite, and reduce fluctuations in the ground reflectivity and other factors.

Preferably also, the different radio frequencies are transmitted simultaneously to each other. As the satellite moves along its orbit, the reflectivity properties of the Earth's surface below fluctuate rapidly, for example due to sea surface state, ground form, atmospheric factors and conditions such cloud structures, and other factors. By transmitting all of the plurality of frequencies simultaneously, they are all subject to the same reflectivity and transmittance fluctuations, which are therefore largely removed from the estimate of atmospheric pressure.

The transmission of the radio frequencies may typically be pulsed, for example with pulses of all the frequencies being transmitted together with a pulse length of a few microseconds, repeated every few tens of microseconds, every few milliseconds, or every few tens of milliseconds, although various pulse schemes and duty cycles may be used as required.

For similar reasons of ensuring consistency of behaviour between the different frequencies, all of the plurality of different radio frequencies are also preferably transmitted using the same antenna 18. Although the beam form for the different frequencies will vary slightly even for a single antenna, this measure avoids more significant variations in beam form, antenna gain and other factors between the different radio frequencies which could occur if different frequencies were transmitted using different antennae. To this end, the transmission antenna gain is shown as a single value $G_t$ in FIG. 2.

The receiver 14 receives from the antenna 18 reflections of the plurality of transmitted radio frequencies, following reflection at the Earth's surface. Preferably, the reflections of the different frequencies are all received by the same antenna 18, for the essentially the same reasons as discussed above, and to this end the receiver antenna gain is shown as a single value $G_r$, which may be the same value as $G_t$ if the same antenna is used for both transmission and reception as shown in FIG. 2.

The receiver 14 makes measurements of the received reflections at each of the plurality of radio frequencies, for example measurements of received power $P_r$ at each different frequency $f_1$, $f_2$ etc. These reflection measurements are then used by an atmospheric pressure estimator 24 to estimate atmospheric pressure $P_o$, for example an estimate of atmospheric pressure referenced to mean sea level, at the local ground level where the radio reflections took place, or some other measure.

The presence of water vapour and/or liquid water (largely as cloud droplets) in the path of the radio waves is also likely to have a measurable effect on the absorption of the radio waves, and indeed an effect which varies between the plurality of radio frequencies used. The arrangement of FIG. 2 therefore also shows an optional radiometer 16 on board the satellite 10 which is used to passively detect radio waves in one or more frequency bands representative of water vapour and/or liquid water, in particular along the direction of the path of the radio waves transmitted from and reflected back to the satellite. These water related measurements may then also be passed to the atmospheric pressure estimator 24 for use in more accurate estimation of atmospheric pressure.

In some embodiments, the radiometer 16 may instead be located on a second satellite which is sufficiently closely spaced from the transmitting and reflection receiving satellite 10 for the radiometer measurements to still be applicable to analysis of the transmitted and received reflected radio waves. Such a second satellite may for example be in a tandem configuration with the first satellite, with the two following the same orbit but at a spacing of, say, a few hundred metres to a few kilometres, for example as implemented using the TanDEM-X satellite system.

Although the estimation of atmospheric pressure may be implemented on board the satellite, more typically the reflection measurements, and any measurements taken by the radiometer 16, will be transmitted by data sending equipment 20 of the satellite (and data sending equipment of a second satellite if carrying the radiometer), to be received by ground based data receiving equipment 22, for forwarding on to the one or more computer systems used to implement the atmospheric pressure estimator 24.

However, at least some processing of the reflection measurement data may take place on board the satellite(s) before transmission, for example in data processor 19. Typical operations which could be carried out at the satellite may include for example, compensation of the reflection measurements for variations in the transmitted powers of the transmitted radio frequencies, calculating ratios of the received reflections, averaging over time the received reflections or ratios to reduce the total data to be transmitted, and/or compressing the data to be transmitted in other ways. In some implementations the atmospheric pressure itself may be estimated on board the satellite, for example using data processor 19, and that estimate transmitted by the data sender 19.

The estimated atmospheric pressure $P_o$, which will typically be provided as a series of data points along the ground track of the satellite, may then be used in a variety of ways, for example by being passed to a personal computer 26 or other computer system for further use, analysis, display, storage and so forth. For example, the estimated atmospheric pressure measurements may be combined with other meteorological data for use in weather forecasting models and similar.

Figure 3:
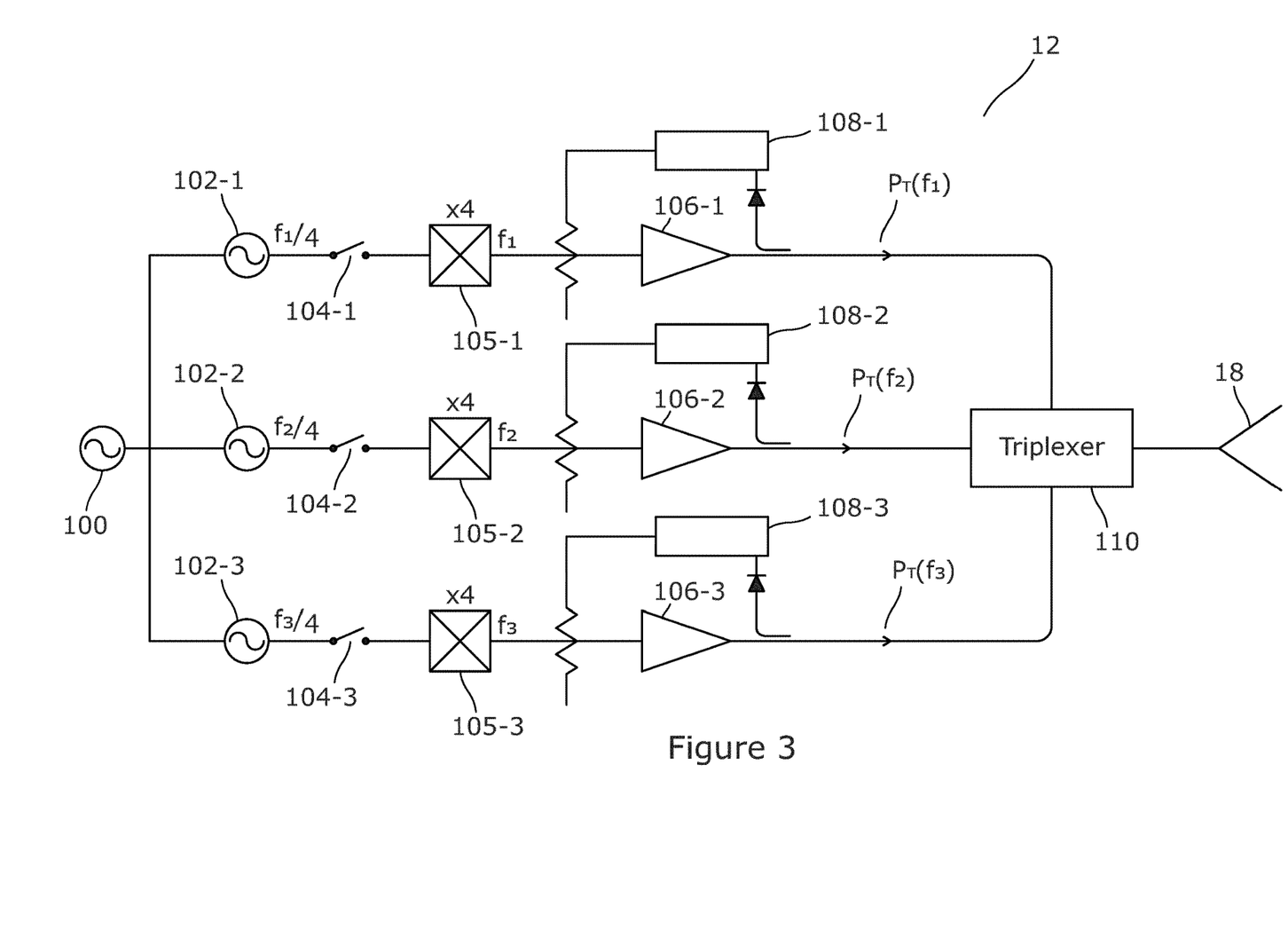
FIG. 3 shows in more detail how the transmitter element of FIG. 2 may be implemented.

FIG. 3 shows in more detail how the transmitter 12 aspect of the satellite may be implemented. A frequency reference 100 feeds to three separate signal sources 102-1,2,3 which respectively generate intermediate frequency signals, each of which feeds via a respective switch 104-1,2,3 into a frequency ×4 multiplier 105-1,2,3 to generate signals at each of the three different radio frequencies $f_1$, $f_2$, $f_3$. Each frequency ×4 multiplier then feeds to a separate power amplifier 106-1,2,3.

Each power amplifier is provided with an individually calibrated digital power monitor 108-1,2,3, so that the radio frequency signals fed to triplexer 110 are preferably of equal power $P_t$ before being passed to the antenna 18 for transmission towards the Earth's surface as illustrated in FIG. 1. However, if the radiofrequency signals output by the power amplifiers are of two or more different powers for different frequencies, this can be compensated for by corresponding amplification and/or attenuation in the receiver 14 described below, and/or by adjusting subsequent calculations for example in the atmospheric pressure estimator 24 of FIG. 2. In some embodiments it may be desirable to have one or more of the radio frequency signals to be transmitted with different power levels, for example with a higher power level used for a radio frequency signal which is expected to undergo particularly high attenuation in the path to the Earth's surface and back.

Although the transmitter 12 shown in FIG. 3 comprises three channels so as to allow three separate radio frequencies to be transmitted, two, four, or more channels may be used as required by the number of radio frequencies to be used in the estimation of atmospheric pressure.

Figure 4:
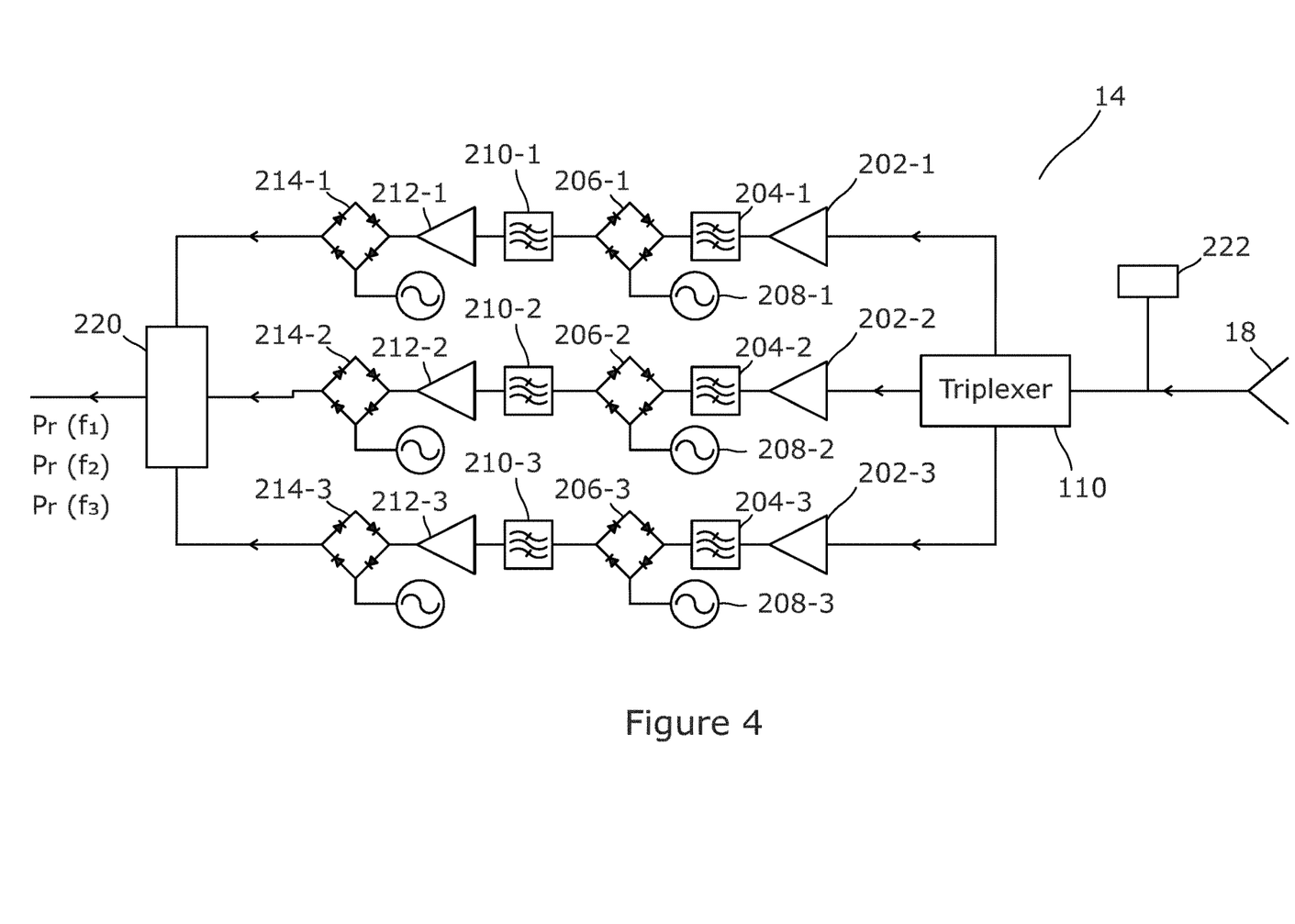
FIG. 4 shows in more detail how the receiver element of FIG. 2 may be implemented.

FIG. 4 shows in more detail how the receiver 14 aspect of the satellite may be implemented. The triplexer 110 of FIG. 3 receives the reflected radio signals from the antenna 18, and passes these equally to three channels. In each channel a low noise amplifier 202-1,2,3 first amplifies the signal received from the triplexer 110, and feeds the amplified signal to a filter 204-1,2,3 to select the required radio frequency. The filtered signal in each channel is then passed to a first down converter 206-1,2,3 which is driven by a local oscillator 208-1,2,3 to bring the radio frequency to be selected by each channel to a channel frequency matching a subsequent intermediate frequency filter 210-1,2,3. The signal now further filtered to select for the chosen channel frequency is then amplified by an intermediate frequency amplifier 212-1,2,3 before further reduction in frequency by a second down converter 214-1,2,3, for sampling into digital form by data acquisition unit 220.

The data acquisition unit 220 then outputs suitable values for the measured reflections at each of the different channel frequencies, for example as measurements of received power $P_r$ at each channel frequency. As for the transmitter 12, although the receiver 14 shown in FIG. 4 comprises three channels so as to allow three separate radio frequencies to be measured, two, four, or more channels may be used as required by the number of radio frequencies to be used in the estimation of atmospheric pressure.

A calibration noise source 222 may also be provided to feed calibration noise to the triplexer 200 for periodic or continuous calibration of the receiver 14.

The received power $P_r$ at each channel frequency of transmitted and received radio waves can be approximated using the radar equation generally used to calculate the magnitude of a received signal from an extended reflector such as the sea surface. This is seen for example on page 9 of Flower and Peckham 1978 as reference above, and with minimal changes can be written, as:

$$P_r = \left( \frac{P_t G_r G_t \theta_3 \cdot \varphi_3 \lambda^2 \tau^2(\theta) \sigma(\theta)}{(4\pi)^3 R^2(\theta)} \right) \quad (1)$$

where:
- $P_r$ received power at antenna;
- $P_t$ transmitted power;
- $G_t$, $G_r$ transmit and receive antenna gain;
- $\theta_3 \cdot \varphi_3$ antenna 3 dB angular beam-width;
- $\lambda$ transmitted/received radio wavelength;
- $\sigma(\theta)$ radar cross-section of reflector;
- $T(\theta)$ total atmospheric transmission coefficient (one-way);
- $R(\theta)$ distance between receiver and reflector;
- $\theta$ angle from nadir.

The 3 dB beam-width is related to antenna gain. As discussed above, the same antenna may advantageously be used for both transmit and receive, with antenna gain equal to G. Since $\theta_3 \cdot \varphi_3 = 4 \cdot \pi/G$, and the antenna gain is a function of area and wavelength: $G = 4 \cdot \pi \cdot A/\lambda^2$, equation (1) can be simplified in the case of nadir observation, where $\theta$ will be zero. The received power for nadir can be simplified to:

$$P_r = \left( \frac{P_t A \tau^2 \sigma^o}{4\pi h^2} \right) \quad (2)$$

Here, h is the satellite altitude and $\sigma^0$ represents the reflecting ability of the surface in relation to an isotropic reflector and includes the directionality of the reflection as well as the reflectivity of the surface. ($P_t \tau$) is the power reaching the surface of the Earth which is the transmitted power reduced by the atmospheric transmissivity factor, and ($A/4 \pi h^2$) gives the fraction received by the area A at a range h from an isotropic emitter such that $A=\pi r^2$, where r is the antenna radius. If the antenna efficiency factor $\eta$ is known then the received power will be simplified further as:

$$P_r = \left( \frac{P_t \eta^2 r^2 \tau^2 \sigma^o}{h^2} \right) \quad (3)$$

As noted elsewhere in this discussion, it may be advantageous to arrange for the transmitted power of each of the plurality of radio frequencies to be equal, to be transmitted from the same antenna 18, and to be transmitted at the same time. Transmitting at the same time ensures that the transmissions are from the same or similar field of view relative to the Earth's surface from which reflections take place, and are subject to the same atmospheric and surface conditions. The received signal power for the plurality of radio frequencies will therefore differ mainly due to the total atmospheric transmissivity at each frequency. If different transmitted powers are transmitted for each frequency, then power monitoring in the transmitter (see FIG. 3) can be used to help compensate calculations carried our using the measurements of received reflections.

The described techniques rely on the variance of atmospheric absorbance with radio frequency, but the use of multiple radio frequencies in making consistent and comparable measurements of reflected signal can itself give rise to a number of difficulties. However, such difficulties can be addressed through careful selection of radio frequencies in order to promote stability, reduce fluctuations, and promote improved accuracy in measurement of atmospheric pressure. Although it may be important to select radio frequencies which are in line with ITU-R allocations for space services, a number of other factors are also relevant.

Since the estimation of atmospheric pressure relies on differences in oxygen band absorption between the different radio frequencies used, the radio frequencies should be selected to maximise the differences in oxygen band absorption between each frequency of a pair, or more generally between two frequency bands, of which reflection measurements are to be compared.

This generally implies use of a wider range of frequencies and wider spacing between frequency bands. However, at the same time it is desirable to use a small enough range of frequencies such that all of the frequencies can be transmitted, and indeed received, by the same antenna, and for the transmission and reception properties of the antenna such as gain and beam form to be as similar as possible between the different frequencies.

Although a wider range of frequencies may be advantageous to increase differences in oxygen band absorption across the range, using frequencies too close to the oxygen absorption peak can lead to very weak reflections and therefore poor signal to noise ratio in the measurements of reflections. Rather, the frequency chosen closest to the oxygen absorption peak should still provide a good link margin in the link-budget from space.

Figure 5:
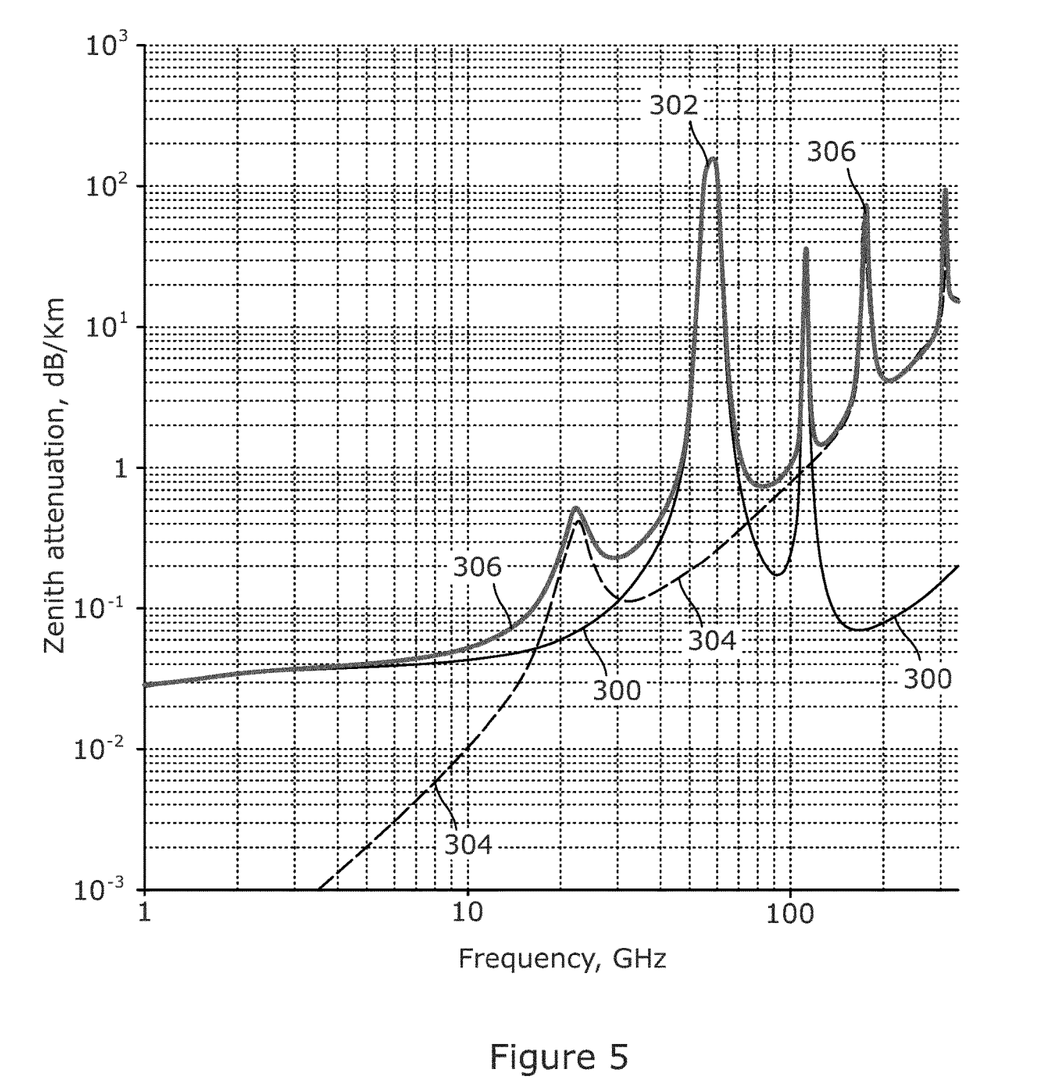
FIG. 5 illustrates how zenith attenuation of radio waves transmitted by satellite are absorbed by the atmosphere.

FIG. 5 provides a graph of zenith attenuation by atmospheric gases according to ITU Recommendation P.676-11 (2016). The dark curve 300 represents attenuation by dry air, and the main 60 GHz peak 302 of attenuation due to atmospheric oxygen can be clearly seen. The dashed curve 304 represents attenuation by water vapour, and the grey curve 306 the total of the two. It can be seen that a suitable range of radio frequencies above the oxygen absorption peak, from which suitable frequencies can be selected for estimating atmospheric pressure according to embodiments of the invention, is generally from about 60 GHz to about 80 or 90 GHz. However, in order to provide sufficient difference in absorption between different frequencies, and to satisfy other factors discussed above, the selected frequencies may be chosen from two, or potentially more than two, frequency bands.

Figure 6:
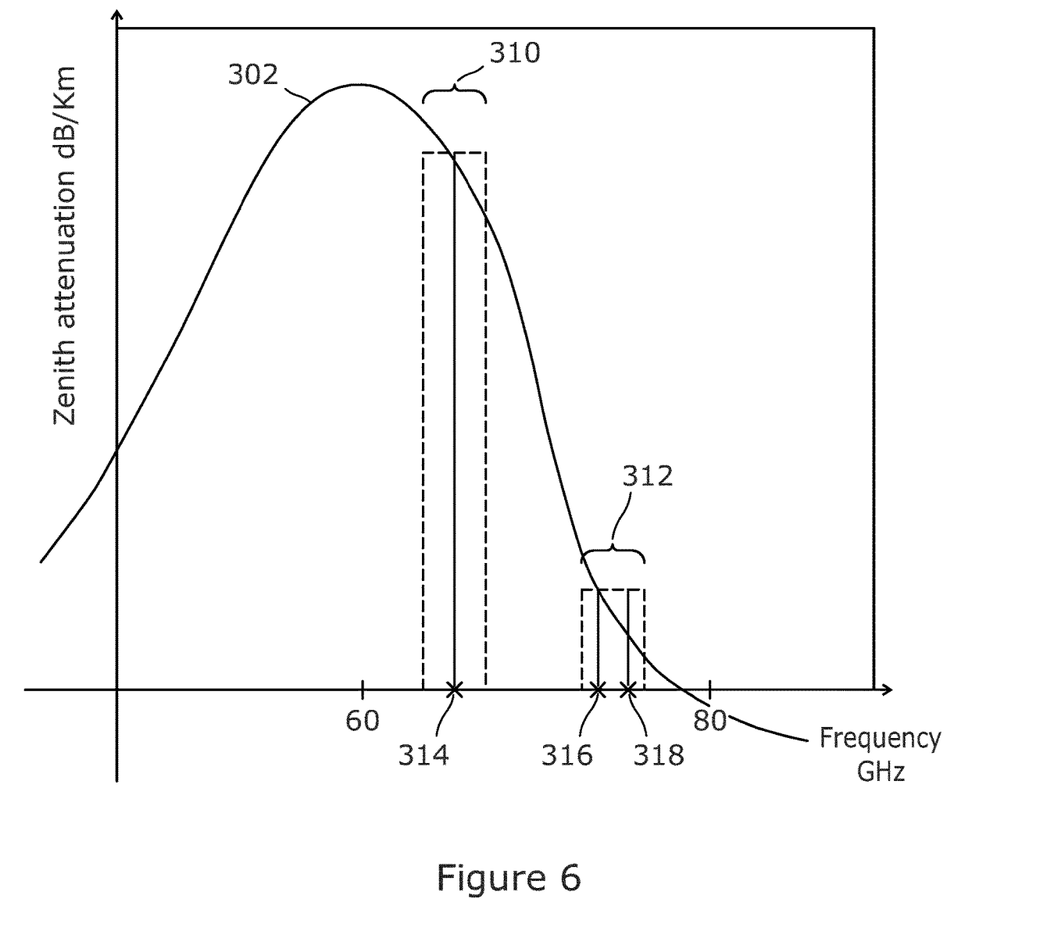
FIG. 6 is a sketch showing where first and second frequency bands for use in estimating atmospheric pressure may be positioned relative to the 60 GHz oxygen absorption peak of FIG. 5.

To this end, FIG. 6 illustrates how the plurality of different frequencies for transmission by the arrangement of FIG. 3, and receiving by the arrangement of FIG. 4, may be selected from two, or potentially more than two, frequency bands, illustrated in FIG. 6 as a first, lower frequency band 310, and a second, upper frequency band 312. Both bands are located above 60 GHz absorption peak, with the first band being closer to the peak where absorption is higher, and the second band being further from the peak where absorption is lower. At least one of the frequencies is located in the first band, and at least one in the second band. Atmospheric pressure can then be estimated by comparing between measurements of reflections at a pair of frequencies, where the pair comprises a frequency in both of the frequency bands, or by making such a comparison at each of multiple such pairs. For example, a ratio of reflected power can be calculated for each of one or more distinct pairs of frequencies, where each pair comprises a frequency in each of the two bands.

By way of example, the first frequency band 310 may comprise, or may include only, a single frequency, shown in FIG. 6 as frequency 314, and the second frequency band 312 may comprise, or may include only, two frequencies, shown in FIG. 6 as frequencies 316 and 318. Atmospheric pressure can then be estimated by comparing measurements of received reflections at the frequency in the first frequency band with measurements of the received reflections at each of the frequencies in the second frequency band. For example, ratios of reflected power between the single frequency 314 in the first band, and each of the two frequencies 316, 318 in the second frequency band, may be used in the estimation of atmospheric pressure.

Figure 7:
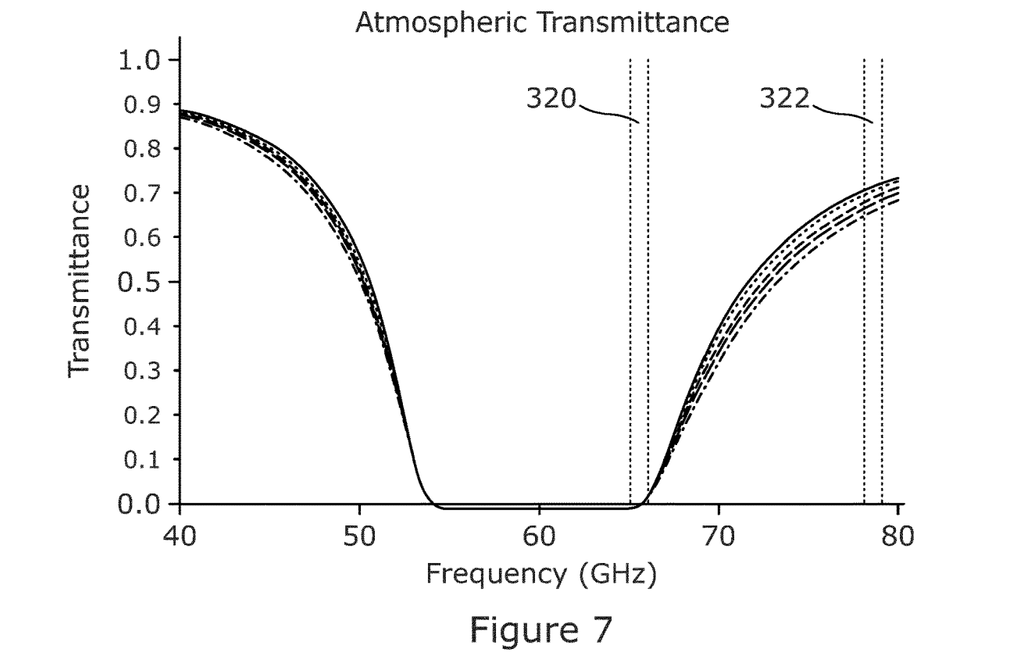
FIG. 7 shows in more detail where the first and second frequency bands may be located in the spectrum relative to an atmospheric transmittance graph.

FIG. 7 shows the 60 GHz oxygen absorption peak in more detail, with the ordinate in this graph being a linear scale of transmittance. The frequency ranges labelled as 320 and 322 include the ranges from 65 to 66 GHz and from 78 to 79 GHz (optionally not including the end values), which are outside ITU restricted spectrum and therefore may more readily be used for radio wave transmissions according to the currently described techniques. This graph shows calculated atmospheric transmittance according to a wide range of different climatologies, ranging from a polar winter climatology through to a tropical climatology, although as can be seen the general form of the transmittance curve for each is similar. It can be seen that a suitable first band for selection of one or more frequencies for estimating atmospheric pressure may therefore be the range, or a located within the range, from about 65.0 to 66.0 GHz, and a suitable second band may therefore be the range, or located within the range, from 78.0 to 79.0 GHz, each range optionally not including the end points.

Figure 8:
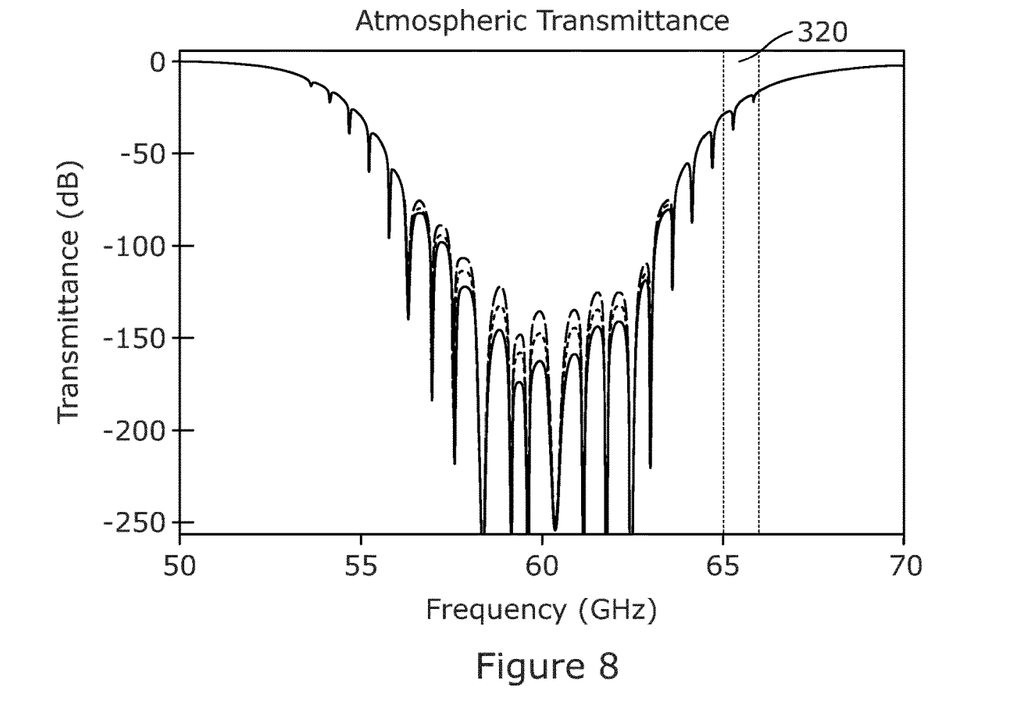
FIG. 8 shows atmospheric transmittance on a log scale such that cusp features in the transmittance are more visible.

Aspects of these ranges for estimating atmospheric pressure can more readily be seen in the graph of FIG. 8 where the ordinate is a log scale of transmittance in decibels. From FIG. 8 it can be seen that the 65.0 to 66.0 GHz frequency range corresponds to a transmittance of some −15 to −30 dB, which provides adequate reflected power back at the satellite for accurate measurement and reliable operation, while also being of sufficient attenuation relative to the 78.0 to 79.0 GHz frequency range to yield a good atmospheric pressure estimate.

However, from FIG. 8 it can also be seen that the cusps in the transmittance profile which appear very slight on the linear scale of FIG. 7 are actually of considerable depth on the decibel scale. These cusps are inherent features of the absorption spectrum, and selecting a radio frequency too close to such a spectral feature is likely to exaggerate the effects of any frequency instability in the radar, and to make any estimate of atmospheric pressure less accurate.

Figure 9:
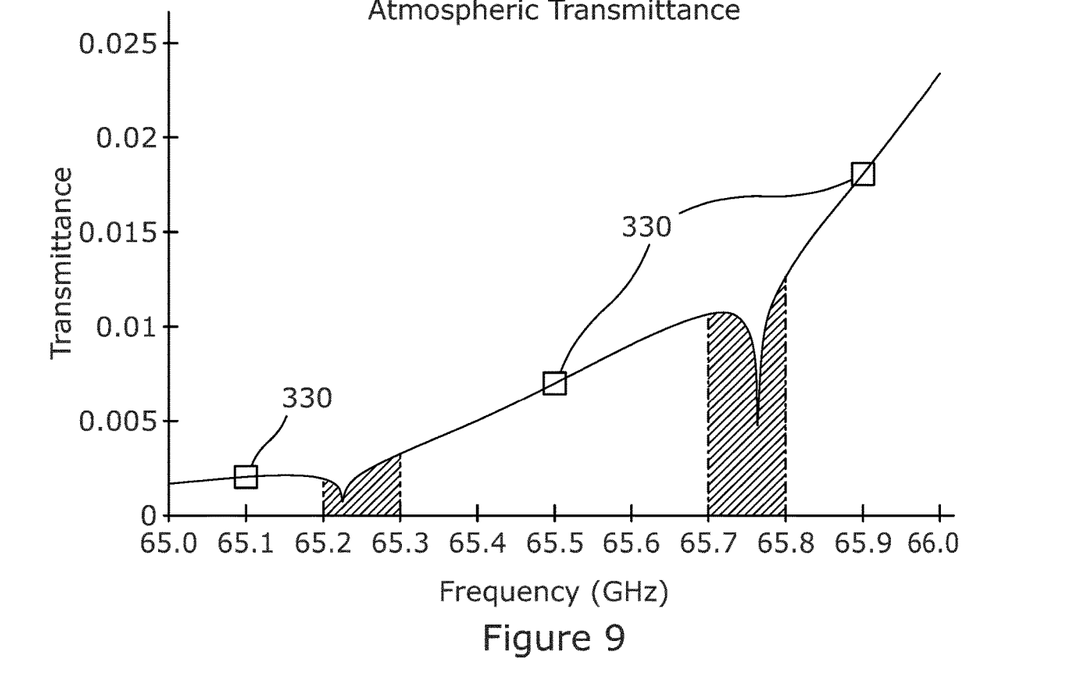
FIG. 9 enlarges part of the transmittance curve of FIG. 8 to show how the first frequency band of FIG. 6 maybe structured.

FIG. 9 shows a small part of the range of FIG. 8, in the frequency range from to 66.0 GHz, and on a linear ordinate scale of transmittance, and for the averages of the climatologies used for the FIGS. 7 and 8 calculations. In order to avoid reduced accuracy due to the cusp features, the first band noted above should preferably also avoid the cusp features which are centred at about 65.23 GHz and 65.76 GHz, for example with the first band excluding one or both of the ranges of 65.2 GHz to 65.3 GHz, and 65.7 to GHz, which are depicted as shaded in FIG. 9. These excluded ranges may be defined with slightly different end points, for example with any of the ranges 65.20 to 65.25 GHz, 65.7 to 65.775 GHz, or 65.72 to 65.78 GHz being excluded from the first frequency band.

In order to avoid excessive levels of absorption, the first band may also include only frequencies at and/or above 65.3 GHz (optionally also excluding any of the ranges of the upper cusp of FIG. 9 set out above), or only at and/or above 65.775 or 65.8 GHz (thereby excluding both cusps). For example, the first band may be defined as from 65.775 or 65.8 GHz, to 66.0 GHz In embodiments where three or more frequencies are used, two frequencies may be used from this lower, first band, of FIG. 9, typically with one being selected from below the upper cusp seen at about 65.76 GHz, and one from above that cusp. However, in embodiments where three frequencies are used, it will be more usual for just a single frequency to be selected from this first, lower band, and for two frequencies to be selected from the second, upper band described in more detail below. By way of example, FIG. 9 shows three options for particular frequency selections in the first band, shown as squares 330, at 65.1, 65.5 and 65.9 GHz. Just one, both, or all three of these could be used.

Figure 10:
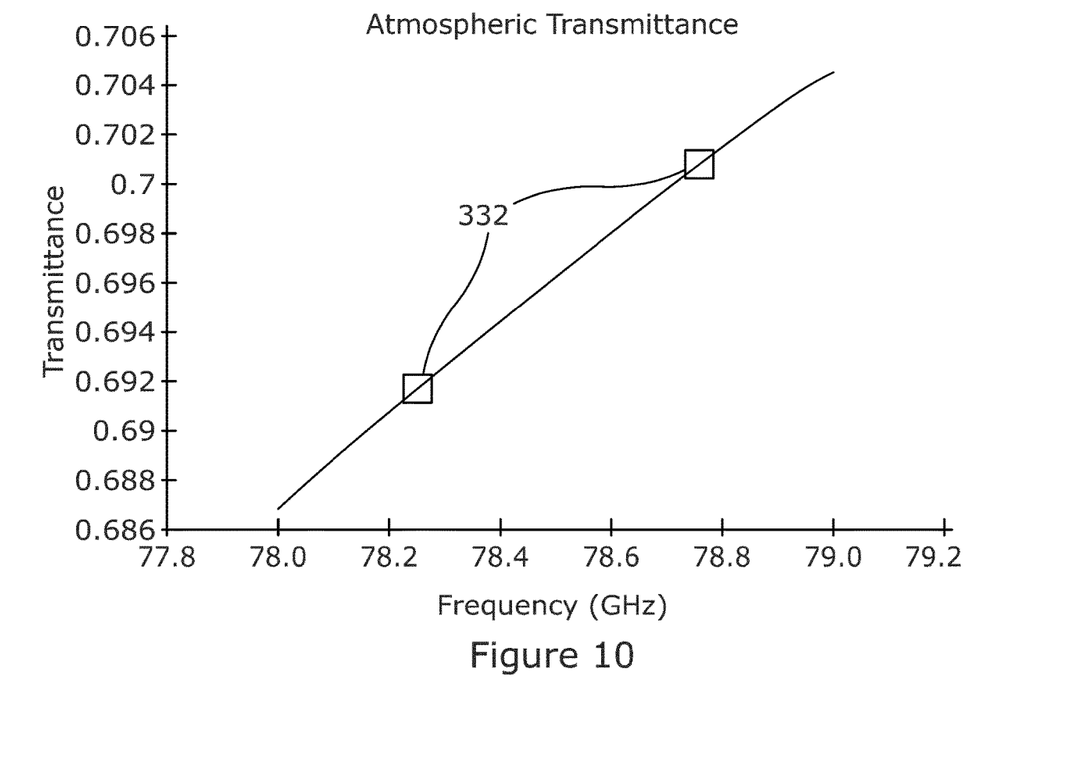
FIG. 10 enlarges a different part of the transmittance curve of FIG. 8 for discussion of the second frequency band.

FIG. 10 shows in magnified view a small portion of the graph of FIG. 7, but with just a single climatology used, and in particular showing the modelled transmittance from 78.0 to 79.0 GHz. As noted above, the second frequency band may be defined as being limited to the frequencies from 78.0 to 79.0 GHz. If three or more frequencies are used in total, at least two may be selected from this second band. In such as case, the selected frequencies should preferably be spaced reasonably widely from each other, for example being separated by at least 0.5 GHz, although this may be constrained by the design of the receiver bandwidth. In FIG. 10 two particular options for particular frequency selections as shows as squares 332, at 78.2 and 78.8 GHz.

Advantageously, the transmittance or absorption in the illustrated 78.0 to 79.0 GHz range is quite linear, so that the selection of frequencies may be more flexible.

As discussed above, typically, the plurality of frequencies may comprise a single frequency $f_1$ in the first band, and two separate frequencies $f_2$ and $f_3$ in the second band. These can then be used by determining a first ratio of returned power between the first band frequency and one of the second band frequencies $P_r(f_2)/P_r(f_1)$ and a second ratio of returned power between the first band frequency and the other of the second band frequencies $P_r(f_3)/P_r(f_1)$. An average of these two ratios can then be used to estimate atmospheric pressure as discussed in more detail below, or each ratio can be used to make such an estimate as discussed below with the estimates of atmospheric pressure then being averaged.

If four or more frequencies are used, then a similar scheme can be implemented by, for each of multiple, or all available, different pairs of frequencies, taking a ratio of returned power between the frequencies of the pair, where each pair has a frequency both in the first band and in the second band. Typical embodiments may provide three such frequencies in the second band, each of which is used to form a return power ratio with one frequency in the first band.

Ways in which atmospheric pressure can be estimated, using measurements of reflections back to the satellite of the radio waves transmitted by the satellite, will now be described. The reflected power measured at the satellite of transmitted frequency f can be approximated as described in B. Lin and Y. Hu, "Numerical simulations of radar surface air pressure measurements at $O_2$ bands", IEEE Geoscience and Remote Sensing Letters, 2(3), 324-328, 2005:

$$P_r(f) = \left(\frac{P_T G_r G_t \lambda^2}{(4\pi)^3}\right)\left(\frac{\sigma^o(f)}{r^2}\right)\exp\left(-\frac{2\alpha_o M_o P_o}{g} - 2\alpha_L L - 2\alpha_v V\right) \quad (4)$$

The first term on the right-hand side of the equation includes depends on the characteristics of the radar. $P_T$ represents the transmitted power; $G_r$ and $G_t$ a represent the transmitter and receiver antenna gains respectively (these are identical if the same antenna is used for both).

The second term on the right hand side represents frequency dependence changes in the reflectivity at the Earth's surface, $\sigma^0$ (radar normalised cross-section), and the range r between transmitter and receiver. The third term includes the mixing ratio of $O_2$: $M_0$ is the mass mixing ratio of oxygen to total air, and $P_0$ is the surface air or surface atmospheric pressure. Coefficients $\alpha_0$, $\alpha_L$, $\alpha_U$ are the effective absorption coefficient for atmospheric column $O_2$, cloud liquid water path L, and column water vapour V respectively.

If the frequency response of the radar is well characterised over the range of frequencies and the absorption characteristics due to water vapour and liquid water are similar over the range of frequencies, then the ratio of the radar received power for a pair of frequencies, for example with one frequency in each of the first and second bands discussed above, can be estimated as:

$$\frac{P_r(f_1)}{P_r(f_2)} = \left(\frac{C(f_1)}{C(f_2)}\right)\exp\left(-\frac{2(\alpha_o(f_1) - \alpha_o(f_2))M_o P_o}{g}\right) \quad (5)$$

Here $C(f_1)$ is the frequency dependent radar characteristics term. If the differential absorption index $R_i(f_1, f_2)$ is the logarithm of the radar return ratio shown in equation 5, then the surface pressure $P_0$ can be written as:

$$P_o = \left(-\frac{2(\alpha_o(f_1) - \alpha_o(f_2))M_o}{g}\right)^{-1} \ln\left(\left(\frac{C(f_2)}{C(f_1)}\right)\left(\frac{P_r(f_1)}{P_r(f_2)}\right)\right) \quad (6)$$

$$P_o = \left(\frac{2(\alpha_o(f_2) - \alpha_o(f_1))M_o}{g}\right)^{-1} (C_i(f_2, f_1) + R_i(f_1, f_2)) \quad (7)$$

Or defining terms for a linear relationship between $R_i$ and $P_o$, $$P_o = (C_o(f_1, f_2) + C_1(f_2, f_1) R_i(f_1, f_2)) \quad (8)$$

Here $C_o$ and $C_1$ are the wavelength-dependent coefficients of the relationship between the radar power ratio and surface air pressure, and can be estimated from the radar measurements or theoretical calculations of the radar system design. The differential absorption index $R_i(f_1, f_2)$, is the logarithm of the ratio of the radar return exclusive of the frequency response of the radar.

Air pressure other than at the surface, for example a value for air pressure at sea level, or some other altitude, or some other measure of air pressure such as a height of a particular pressure, can be derived in similar ways.

The above calculations rely on the absorption due to either of water vapour or liquid water (in particular clouds) in the radar path being very similar between the two frequencies of a pair $f_1$, $f_2$. However, this is may not be the case, especially where the frequencies of a pair are quite widely spaced as discussed in respect of the first and second frequency bands above. Therefore, as already illustrated in FIG. 2, the satellite 10 (or a second satellite as discussed above) includes a microwave radiometer 16 which is arranged to measure suitable radiation bands from which total or column liquid water L and total or column water vapour V along or close to the path of the transmitted and reflected radio waves. These radiation bands are measured passively.

The measurement of water vapour and liquid water can be performed using the radiometer, either operating around the 22 GHz or the 183 GHz water window, for example operating in the range 175-192 GHz with frequency bands each of 40-400 MHz in size. The radiometer can also be used to measure temperature for example using radiation between 50-58 GHz, for example at a bandwidth of 1.5 MHz. This measurement of temperature can then be used to assist in the estimation of total or column liquid water L and the estimation of total or column water vapour Valong the radar path, for example as described in F. Solheim et al., "*Radiometric profiling of temperature, water vapour and cloud liquid water using various inversion methods*", Radio Science, volume 33, number 2, pages 393-404, March-April 1998. The measured temperature can also or instead be used as an output of the system in its own right (for example by the atmospheric pressure estimator) and/or to define and/or output an estimated profile of pressure with respect to altitude.

In order to estimate atmospheric pressure using the reflection measurements, but compensated for water vapour V and/or liquid water L along the path of the radio waves transmitted by and received back at the satellite, equation 5 above becomes more generally:

$$\frac{P_r(f_1)}{P_r(f_2)} = \quad \text{(equation 9)}$$

$$\left(\frac{C(f_1)}{C(f_2)}\right)\exp\left(-2(\alpha_l(f_1) - \alpha_l(f_2))L - 2(\alpha_v(f_1) - \alpha_v(f_2))V - \frac{2(\alpha_o(f_1) - \alpha_o(f_2))M_o P_o}{g}\right).$$

If we then denote: $\Delta l = -2(\alpha_l(f_1) - \alpha_l(f_2))L$, and $\Delta v = -2(\alpha_v(f_1) - \alpha_v(f_2))V$, then:

$$P_o = \left(-\frac{2(\alpha_o(f_1) - \alpha_o(f_2))M_o}{g}\right)^{-1} (C_i(f_2, f_1) + \quad \text{(equation 10)}$$

$$R_i(f_1, f_2) - \Delta l - \Delta v).$$

In the arrangement illustrated in FIG. 2 the estimation or calculation of atmospheric pressure is carried out, for example as described in detail above, by an atmospheric pressure estimator element 24. Such an element may be implemented in various ways, and in various locations, but generally may be provided by a suitably programmed computer system, comprising or executing computer program code on one or more computer processors, where that code is arranged to implement the described estimations or calculations. Such a computer system will also typically comprise suitable computer memory for data and program storage, and suitable data connections and in/out facilities.

Results of the estimation of atmospheric pressures may be stored and/or transmitted in various ways, for example transmitted for storage in a database for subsequent use by one or more weather forecasting systems.

Although specific embodiments of the invention have been described with reference to the drawings, the skilled person will be aware that variations and modifications may be applied to these embodiments without departing from the scope of the invention defined in the claims. For example, although various techniques have been described in the context of a satellite system, the invention could be implemented using other radar platforms for example using a winged aircraft, balloon, or other vehicle, or a combination of two or more such vehicles. Although described in terms of a single satellite, transmission and reception of the radio waves could be carried out by more than one satellite in combination, or by a combination of a satellite, one or more ground stations, and so forth.

Although the invention has been described as estimating atmospheric pressure of the Earth, it may be applied to estimating atmospheric pressure on a different planet, for example using an orbiting planetary probe, where such an atmosphere has suitable absorption properties and other characteristics.

The invention claimed is:

1. A method for remotely measuring atmospheric pressure using a satellite, comprising:
    receiving measurements, of reflections received back at the satellite at each of a plurality of different frequencies of radio waves, following transmission from the satellite into the atmosphere of radio waves at each of the different frequencies; and
    estimating atmospheric pressure by comparing the measurements of reflections of each of the different frequencies;
    wherein one or more of the plurality of different frequencies lie in a first frequency band, the one or more remaining ones of the plurality of different frequencies lie in a second frequency band which is spaced from said first frequency band, and estimating atmospheric pressure comprises comparing, for each of one or more pairs of said plurality of different frequencies, between measurements of reflections of the frequencies of the pair, where each pair comprises a frequency in both of the frequency bands,
    wherein the first band is further limited to the range of frequencies from 65.8 GHz to 66.0 GHz, and
    wherein the second frequency band is limited to the range of frequencies from 78.0 to 79.0 GHz.

2. The method of claim 1 wherein the measurements of reflections received back at the satellite comprise measurements of received power at the satellite at each of said different frequencies.

3. The method of claim 1 wherein estimating atmospheric pressure comprises determining one or more ratios of measurements of the received reflections at one or more pairs of said plurality of different frequencies, and estimating atmospheric pressure from said determined ratios.

4. The method of 1 wherein the plurality different frequencies of radio waves comprise at least three different frequencies of radio waves.

5. The method of 1 wherein all of the plurality of different frequencies are between 60 and 80 GHz, or between 60 and 90 GHz.

6. The method of claim 1 wherein the first frequency band comprises one, and the second frequency band comprises two, of the plurality of different frequencies, and estimating atmospheric pressure comprises comparing measurements of reflections at the frequency in the first frequency band with measurements of the reflections at each of the frequencies in the second frequency band.

7. The method of claim 1 wherein the one or more of the plurality of different frequencies lying in the second frequency band comprise two separate frequencies separated by at least 0.5 GHz.

8. The method of claim 1 further comprising receiving radiometer measurements of radio waves received at the satellite, or at another satellite, the radiometer measurements being indicative of one or more of water vapour, liquid water, and temperature along the path of the radio waves transmitted from the satellite into the atmosphere and reflected back to the satellite.

9. The method of claim 8 wherein at least some of the received radiometer measurements indicative of one or more of water vapour and liquid water are within the range from 175 to 192 GHz.

10. The method of claim 8 wherein estimating atmospheric pressure by comparing between the measurements of reflections comprises estimating atmospheric pressure by combining the reflection measurements and the radiometer measurements to estimate atmospheric pressure compensated for water vapour and/or liquid water along the path of the radio waves transmitted from the satellite into the atmosphere and reflected back to the satellite.

11. The method of claim 1 wherein the plurality of different frequencies of radio waves are simultaneously transmitted from the satellite into the atmosphere.

12. The method of claim 1 wherein the plurality of different frequencies of radio waves are one or more of: transmitted from the satellite into the atmosphere using a same antenna of the satellite; received back at the satellite for measurement using the same antenna of the satellite; and both transmitted and received using the same antenna of the satellite.

13. The method of claim 1 wherein each of the plurality of different frequencies of radio waves are transmitted from the satellite into the atmosphere using a same transmitted power.

14. The method of claim 1 wherein the radio waves are transmitted towards, and the reflections are received back from, the nadir direction relative to the satellite.

15. The method of claim 1 wherein transmission of the radio waves is pulsed.

16. The method of claim 1 further comprising:
    transmitting, by the satellite, the radio waves of the plurality of different frequencies into the atmosphere;
    receiving back and measuring, at the satellite, reflections of the transmitted radio waves.

17. One or more non-transitory computer readable media comprising computer program code which, when executed on a computer system, estimates a remotely measured atmospheric pressure, by:
    receiving measurements, of reflections received back at a satellite at each of a plurality of different frequencies of radio waves, following transmission from the satellite into the atmosphere of radio waves at each of the different frequencies; and
    estimating the remotely measured atmospheric pressure by comparing the measurements of reflections of each of the different frequencies
    wherein one or more of the plurality of different frequencies lie in a first frequency band, the one or more remaining ones of the plurality of different frequencies lie in a second frequency band which is spaced from said first frequency band, and estimating atmospheric pressure comprises comparing, for each of one or more pairs of said plurality of different frequencies, between measurements of reflections of the frequencies of the pair, where each pair comprises a frequency in both of the frequency bands,
    wherein the first band is further limited to the range of frequencies from 65.8 GHz to 66.0 GHz, and
    wherein the second frequency band is limited to the range of frequencies from 78.0 to 79.0 GHz.

18. Apparatus arranged to receive measurements, of reflections received back at the satellite at each of a plurality of different frequencies of radio waves, following transmission from the satellite into the atmosphere of radio waves at each of the different frequencies, and to estimate atmospheric pressure by comparing between the measurements of reflections of each of the different frequencies,
    wherein one or more of the plurality of different frequencies lie in a first frequency band, the one or more remaining different frequencies lie in a second frequency band which is spaced from said first frequency band, and estimating atmospheric pressure comprises, for each of one or more pairs of frequencies, comparing between measurements of reflections of the frequencies of the pair, where each pair comprises a frequency in both of the frequency bands,
    wherein the first band is limited to the range of frequencies from 65.8 to 66.0 GHz, and
    wherein the second frequency band is limited to the range of frequencies from 78.0 to 79.0 GHz.

19. The apparatus of claim 18 wherein the plurality different frequencies of radio waves comprise at least three different frequencies of radio waves.

20. The apparatus of claim 18 further arranged to receive radiometer measurements of radio waves received at the satellite, or at another satellite, indicative of one or more of water vapour, liquid water, and temperature along the path of the radio waves, and to estimate atmospheric pressure compensated for water vapour and/or liquid water and/or temperature by using the radiometer measurements.

21. The apparatus of claim 18 further comprising a satellite, the satellite comprising:
    a transmitter arranged to transmit said radio waves at each of the different frequencies into the atmosphere; and
    a receiver arranged to measure reflections of said transmitted radio waves received back at the satellite.

\* \* \* \* \*